US 7,837,227 B2

(12) United States Patent
Kühne et al.

(10) Patent No.: US 7,837,227 B2
(45) Date of Patent: Nov. 23, 2010

(54) AIR-BAG HOUSING

(75) Inventors: Klaus-Peter Kühne, Karlsfeld (DE);
Karl-Heinz Sommer, Stockdorf (DE);
Thomas Reiter, Vierkirchen (DE);
Marcus Weber, Untertheres (DE); Marc Schock, Karlsfeld (DE); Jörg Albert,
Germering (DE)

(73) Assignee: Autoliv Development AB, Vargarda (SE)

( * ) Notice: Subject to any disclaimer, the term of this patent is extended or adjusted under 35 U.S.C. 154(b) by 56 days.

(21) Appl. No.: 12/303,445

(22) PCT Filed: Jun. 16, 2006

(86) PCT No.: PCT/SE2006/000719

§ 371 (c)(1),
(2), (4) Date: Dec. 4, 2008

(87) PCT Pub. No.: WO2007/145550

PCT Pub. Date: Dec. 21, 2007

(65) Prior Publication Data
US 2009/0250909 A1 Oct. 8, 2009

(51) Int. Cl.
*B60R 21/20* (2006.01)
(52) U.S. Cl. .................................... 280/732; 280/728.2
(58) Field of Classification Search ................. 280/732, 280/728.2, 741, 731
See application file for complete search history.

(56) References Cited

U.S. PATENT DOCUMENTS

| | | | | |
|---|---|---|---|---|
| 4,921,735 A | * | 5/1990 | Bloch | 428/34.9 |
| 5,093,163 A | * | 3/1992 | Krummheuer et al. | 428/35.1 |
| 5,289,939 A | * | 3/1994 | Gordon et al. | 229/5.82 |
| 5,393,090 A | * | 2/1995 | Shepherd et al. | 280/728.2 |
| 5,498,030 A | * | 3/1996 | Hill et al. | 280/743.1 |
| 5,603,523 A | * | 2/1997 | Rhule et al. | 280/728.2 |
| 5,902,672 A | * | 5/1999 | Swoboda et al. | 442/203 |
| 6,039,341 A | * | 3/2000 | Doxey et al. | 280/728.2 |

(Continued)

FOREIGN PATENT DOCUMENTS

EP    1 514 745 A1    3/2005

(Continued)

*Primary Examiner*—Paul N Dickson
*Assistant Examiner*—Nicole Verley
(74) *Attorney, Agent, or Firm*—Harness, Dickey & Pierce, P.L.C.

(57) ABSTRACT

An air-bag housing comprising a rectangular frame (1) defining an opening and having a mounting arrangement in the form of flanges (7) to mount the frame in position within a motor vehicle. The frame supports a housing-forming element (21) formed, for example, of fabric. This forms a housing having walls (71, 72) and a floor. The walls (71, 72) are formed seamlessly by folding the fabric in half about a fold-line, and tucking one end of the fold-line into the other end of the fold-line, and inserting the frame between the pieces of fabric to lie adjacent the fold-line. The floor is formed by a plurality of floor-forming tabs (25, 26, 35, 36 etc) carried by the fabric forming the side-walls of the housing. The tabs are folded inwardly to at least partly overlie each other and are secured in position to form the floor of the housing by studs (15, 16, 17, 18) provided on the inflator which pass through co-aligned apertures (27, 30, 38, 39) in the floor-forming tabs (25, 26, 35, 36 etc).

19 Claims, 5 Drawing Sheets

U.S. PATENT DOCUMENTS

| | | | | |
|---|---|---|---|---|
| 6,056,313 | A * | 5/2000 | Lutz et al. | 280/728.1 |
| 6,131,944 | A * | 10/2000 | Henkel et al. | 280/728.3 |
| 6,669,226 | B2 * | 12/2003 | Fowler et al. | 280/728.2 |
| 6,802,526 | B2 * | 10/2004 | Dumbrique et al. | 280/728.2 |
| 6,942,242 | B2 * | 9/2005 | Hawthorn et al. | 280/728.2 |
| 7,159,894 | B2 * | 1/2007 | Ronne et al. | 280/728.2 |
| 7,195,273 | B2 * | 3/2007 | Lewis et al. | 280/728.2 |
| 7,543,844 | B2 * | 6/2009 | Rose et al. | 280/728.2 |
| 7,562,902 | B2 * | 7/2009 | Osterhout | 280/730.2 |
| 7,669,886 | B2 * | 3/2010 | Astrom | 280/729 |
| 2003/0001366 | A1 * | 1/2003 | Debler et al. | 280/732 |
| 2005/0225059 | A1 | 10/2005 | Lewis et al. | |
| 2008/0079243 | A1 * | 4/2008 | Kino et al. | 280/728.2 |

FOREIGN PATENT DOCUMENTS

| | | |
|---|---|---|
| WO | 2005/100104 A1 | 10/2005 |

\* cited by examiner

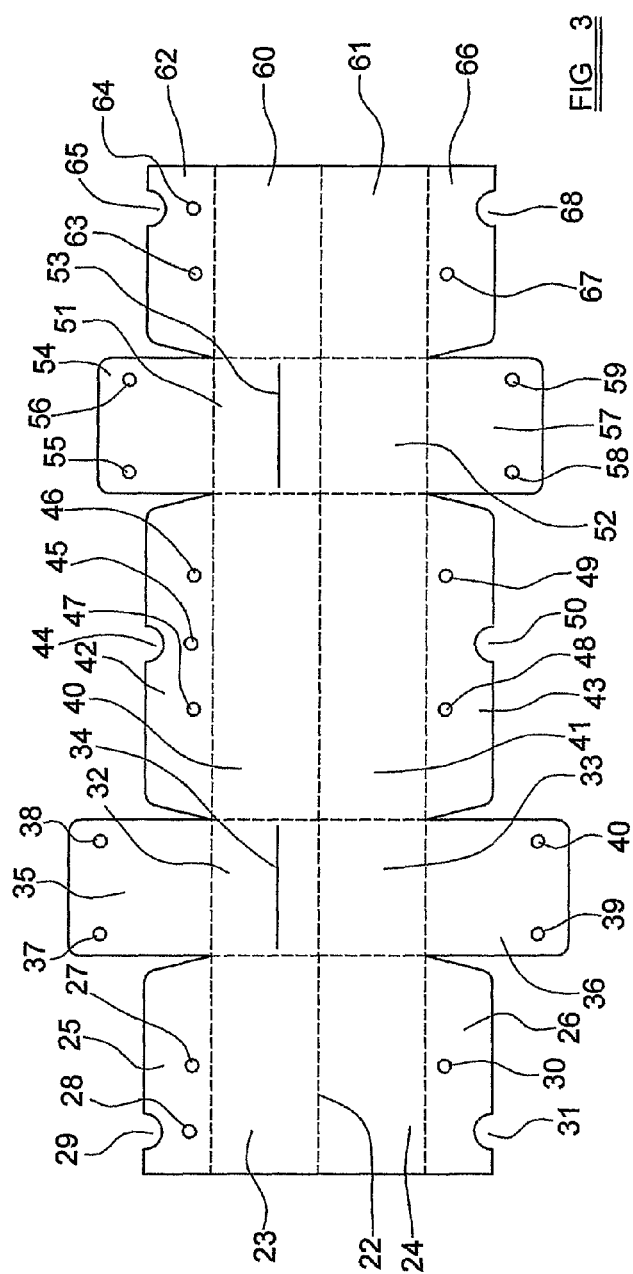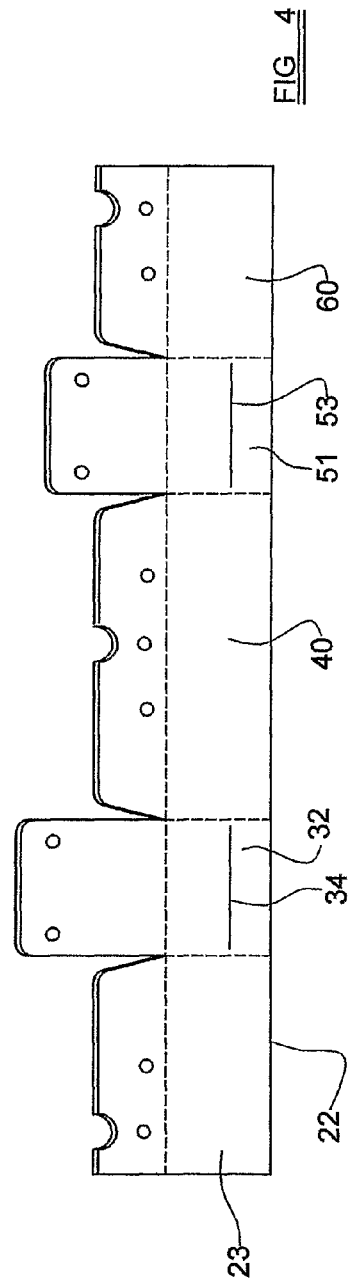

US 7,837,227 B2

AIR-BAG HOUSING

CROSS-REFERENCE TO RELATED APPLICATIONS

This application is a 371 U.S. National Stage of International Application No. PCT/SE2006/000719, filed Jun. 16, 2006, and published in English as WO 2007/145550 A1 on Dec. 21, 2007.

THE PRESENT INVENTION relates to an air-bag housing and, in particular, relates to an air-bag housing for containing an air-bag which is to provide protection for an occupant of a motor vehicle in the event that an accident should occur. The invention also relates to an air-bag assembly incorporating the housing.

It has been proposed to provide motor vehicles with fabric air-bags adapted to be inflated in the event that an accident should occur to provide protection for occupants of the vehicles. A typical air-bag is contained within a housing to protect the fabric of the air-bag and also to retain the air-bag in an appropriate position for inflation in the event that an accident should occur.

Many air-bag housings in current use are made from pressed metal or moulded plastic. Such housings are relatively expensive to manufacture and also have a relatively high weight. There is increasing pressure, in the motor vehicle industry, to reduce the cost of components of motor vehicles and also to minimise the weight of components of motor vehicles.

Consequently the present invention seeks to provide an improved air-bag housing, and an improved air-bag assembly incorporating the housing.

It has been proposed to provide an air-bag housing which comprises a frame and a housing portion which is formed of fabric.

US 2005/0225059 discloses an air-bag housing of this particular type. In the arrangement disclosed in this prior document a multi-part frame is utilised, and the fabric air-bag housing is made from part of the fabric which itself forms the air-bag or inflatable cushion. The fabric used for the housing therefore has the same properties as the fabric used for the cushion, and the described arrangement involves the "trapping" of part of the fabric of the cushion between two components of the frame. The fabric of the housing is formed integrally with the fabric of the air-bag.

According to one aspect of this invention there is provided an air-bag housing, the air-bag housing comprising a frame defining an opening and having a mounting arrangement to mount the frame in position, the frame supporting a housing-forming element constituted by a sheet of flexible material to form a housing having walls and a floor, wherein the frame is a one-piece frame, and the walls are formed seamlessly, and the floor is formed by a plurality of floor-forming tabs carried by the flexible sheet material which at least partly overlie each other and which are secured in position to form the floor of the housing.

Preferably the housing-forming element has two opposed regions, the opposed regions overlapping between the ends of one side-wall of the housing, the housing-forming element consequently extending seamlessly around the corners of the housing.

Conveniently the housing-forming element is a blank having portions which define walls of the housing, the portions defining the walls of the housing carrying the floor-forming tabs.

Advantageously each wall-forming portion carries a respective floor-forming tab.

Conveniently the sheet of flexible material is in the form of a blank, the blank being folded about a fold-line to present superimposed regions, and wherein the frame is inserted in the blank to be adjacent the fold-line.

According to another aspect of this invention there is provided an air-bag housing, the housing comprising a frame defining an opening and having a mounting arrangement to mount the housing in position, and a blank formed from a sheet of flexible material constituting a housing-forming element, wherein the blank is folded about a fold-line to present superimposed regions to form walls of the housing, the frame being inserted in the blank to be adjacent the fold-line, the blank carrying a plurality of floor-forming tabs which are folded in to at least partly overlie each other and which are secured in position to form the floor of the housing.

Conveniently the blank is substantially symmetrical about the fold-line, the blank being provided with wall-forming panels and floor-forming tabs which are substantially symmetrical about the fold-line.

Advantageously the mounting arrangement of the frame comprises two outwardly extending flanges, the housing-forming element being provided with slits to accommodate the flanges.

Conveniently the sheet of flexible material is of woven material.

Preferably the woven material is a woven fabric of 470 Dtex.

Advantageously one wall is formed of two superimposed layers of the sheet of flexible material with a reinforcing element located between said layers.

The invention also relates to an air-bag assembly incorporating an air-bag housing as described above, the air-bag assembly further comprising an inflator secured to the floor of the housing and an air-bag contained within the housing to be inflated by gas from the inflator.

Conveniently the inflator is mounted in position by means of a plurality of studs, these studs passing through co-aligned apertures formed in the floor-forming tabs which at least party overlie each other to secure the floor-forming tabs in position.

Advantageously a deflector is provided within the housing, connected to the gas generator by means of said studs.

Conveniently the outer part of the housing-forming element carries at least one clip to support part of a wiring harness.

In one embodiment the air-bag has an open mouth which is secured to the housing-forming element in a region adjacent the frame.

In order that the invention may be more readily understood and so that further features thereof may be appreciated, the invention will now be described by way of example with reference to the accompanying drawings in which:

FIG. 3 is a view of a fabric blank.

FIG. 4 is a view of the fabric blank when folded,

Figure 1:
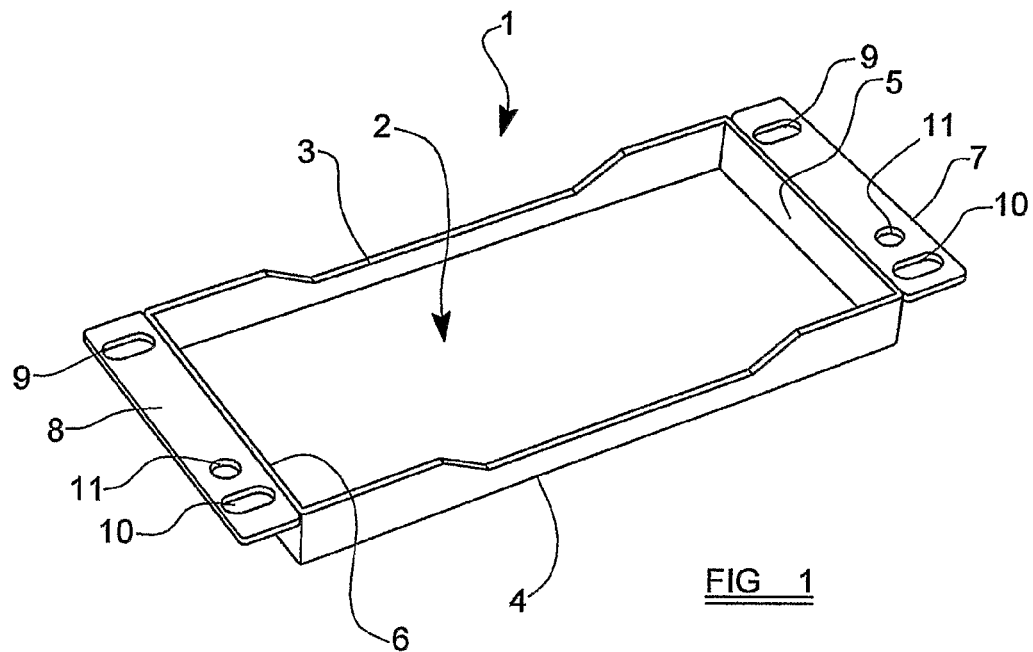
FIG. 1 is a perspective drawing of a frame forming part of an air-bag housing accordance with the invention.

FIG. 1 illustrates a generally rectangular one-piece frame 1 formed, for example, of 2 mm thick steel. The frame 1 defines a generally rectangular opening 2, having two relatively long side-walls 3, 4 and two relatively short transverse end-walls 5, 6. Each end-wall carries an outwardly extending planar flange 7, 8, and each flange is provided with two elongate screw holes 9, 10 and a circular guide aperture 11. The flanges form a mounting arrangement by which the frame may be mounted in position within a motor vehicle.

Figure 2:
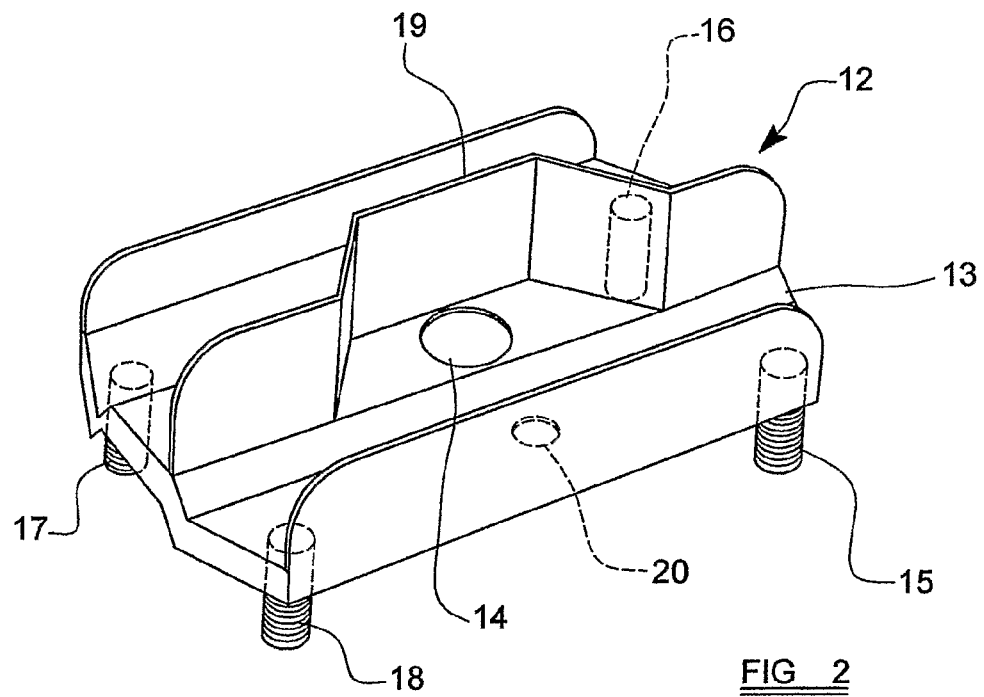
FIG. 2 is a perspective view of an internal deflector.

A deflector element 12 is illustrated in FIG. 2. The deflector element 12 comprises a base plate 13. The base plate 13 incorporates a substantially centrally located aperture 14 to receive a gas injecting nozzle from an inflator. A plurality of threaded studs, in this embodiment four studs 15, 16, 17, 18, extend downwardly from the lower surface of the plate 13. A deflector element 19 extends upwardly from the plate adjacent the aperture 14. The purpose of the deflector is to deflect gas injected into the air-bag in a desired direction so that the air-bag has a desirable inflation characteristic.

At least one further aperture 20 may be provided in the plate 13, for example to accommodate a pressure sensor or the like.

FIG. 3 illustrates a blank which is constituted by a sheet of flexible material. Any appropriate sheet material may be utilised, but in this embodiment the preferred material is a woven fabric of 470 Dtex. The fabric forming the blank is thus relatively thick, stable and robust. Consequently the housing which is formed from the fabric will provide excellent protection for the actual fabric of the air-bag.

As will be appreciated from the following description the preferred blank is substantially symmetrical about an axially extending fold-line, the intention being that the blank will be folded about the fold-line and positioned so that the frame is within the blank, engaging the portion of the blank that defines the fold-line, with the superimposed parts of the blank on opposed sides of the fold-line forming double-thickness walls and double-thickness floor tabs to form a housing to accommodate an air-bag.

Looking at FIG. 3 the blank 21 is of symmetrical form, having an axially extending fold-line 22.

Considering the left-hand end of the blank, two rectangular side-wall-forming panels 23, 24 are provided on opposite sides of the fold-line.

The side-wall-forming panel 23 carries, at its free edge, remote from the fold-line 23, a rectangular floor-forming tab 25, and the side-wall-forming panel 24 similarly carries a corresponding floor-forming tab 26.

The floor-forming tab 25 is provided with two apertures 27, 28 formed therein, which are spaced-apart. A recess 29 is formed in the free edge of the floor-forming tab 25 in transverse alignment with the aperture 28.

The floor-forming tab 26 is provided with an aperture 30 which is located symmetrically with respect to the aperture 27 and is also provided with a recess 31 which is located symmetrically with respect to the recess 29.

Adjacent the side-wall-forming panels 23, 24, on opposite sides of the fold-line 23 are rectangular end-wall-forming panels 32, 33. The panel 32 is provided with a slit 34 spaced away from and extending parallel with the fold-line 23, to accommodate a mounting flange 7 as provided on the frame 1.

The end-wall-forming panel 32 is provided, at its edge remote from the fold-line 22, with a floor-forming tab 35, which is substantially square and similarly the end-wall-forming panel 33 is provided with a corresponding floor-forming tab 36.

The floor-forming tab 35 is provided with two apertures 37, 38 located adjacent the free corners of the tab and similarly the floor-forming tab 36 is provided with symmetrically located apertures 39, 40, which are adjacent the free corners of the tab.

The floor-forming tabs 35, 36 have a greater extent, from the fold-line 22, than the floor-forming tabs 25, 26.

Adjacent the end-wall-forming panels 32, 33, again on opposed sides of the fold-line 22, are side-wall-forming panels 40, 41, of rectangular form, the panels 40, 41 carrying, respectively, rectangular floor-forming tabs 42, 43 which have a similar extent as the floor-forming tabs 25, 26.

The floor-forming tab 42 is provided with three axially aligned apertures 44, 45, 46 and a central recess 47 formed in the free edge, in transverse alignment with the central aperture 45 and corresponding generally with the recesses 29, 31.

The floor-forming tab 23 is provided with two axially aligned apertures 48, 49, in transverse alignment with the apertures 44 and 46 described above, and is also provided with a recess 50 in alignment with the recess 46 described above.

Adjacent the side-wall-forming panels 40, 41 are two further end-wall-forming panels 51, 52 which, it will be appreciated, generally correspond with the end-wall-forming panels 32, 33 described above. The end-wall-forming panel 51 is provided with a slit 53 extending parallel with but spaced from the fold-line 22, the slit 53 being dimensioned to accommodate a mounting flange 11 of the frame 1.

The end-wall-forming panel 51 carries a floor-forming tab 54 at the free edge thereof remote from the fold-line 22, the floor-forming tab 54 being provided with apertures 55, 56 in the corners thereof. The end-wall-forming panel 52 carries a symmetrical floor-forming tab 57 which is provided with apertures 58, 59 in the corners thereof. The floor-forming tabs 54, 57 are similar to the tabs 35, 36, but slightly smaller.

The blank concludes with two further side-wall-forming panels 60, 61, on opposed sides of the fold-line 22, which are virtually "mirror images" of the first described panels 23, 24. The side-wall-forming panel 60 is provided with a floor-forming tab 62, the floor-forming tab 62 having two apertures 63, 64 located adjacent the side-wall-forming panel 60 and also being provided with a recess 65 in the free edge of the floor-forming tab.

Similarly the side-wall-forming panel 61 carries a floor-forming tab 66 which is provided with a single aperture 67 which is substantially symmetrical with the above-described aperture 63 and a recess 68 which is substantially symmetrical with the above-described recess 65.

The blank may be folded, along the fold-line 22, so that the various panels and tabs which are located on opposite sides of the fold-line become superimposed. The panels and tabs are symmetrical, and the small apertures that are symmetrically located about the fold-line 22 become co-aligned.

The blank then presents the appearance shown in FIG. 4.

The thus-doubled blank may then be folded to have a generally rectangular form, by folding the blank about the fold-lines that exist between the adjacent panels 23, 32, 40 51 and 60.

The side-wall-forming panels 23, 24 may be tucked into the side-wall-forming panels 60, 61, thus bringing the recesses 29, 31 in the floor-forming tabs 25, 26 into alignment with the corresponding recesses 65, 68 in the floor-forming tabs 62, 66. Thus, two opposed side regions of the blank are now overlapping in one side-wall of the housing, with the fabric of the blank extending seamlessly around the corners of the housing.

The blank 21 is now positioned with the fold-line 22 at the bottom, with the wall panels extending upwardly and the floor-forming tabs extending upwardly above the wall panels.

Figure 5:
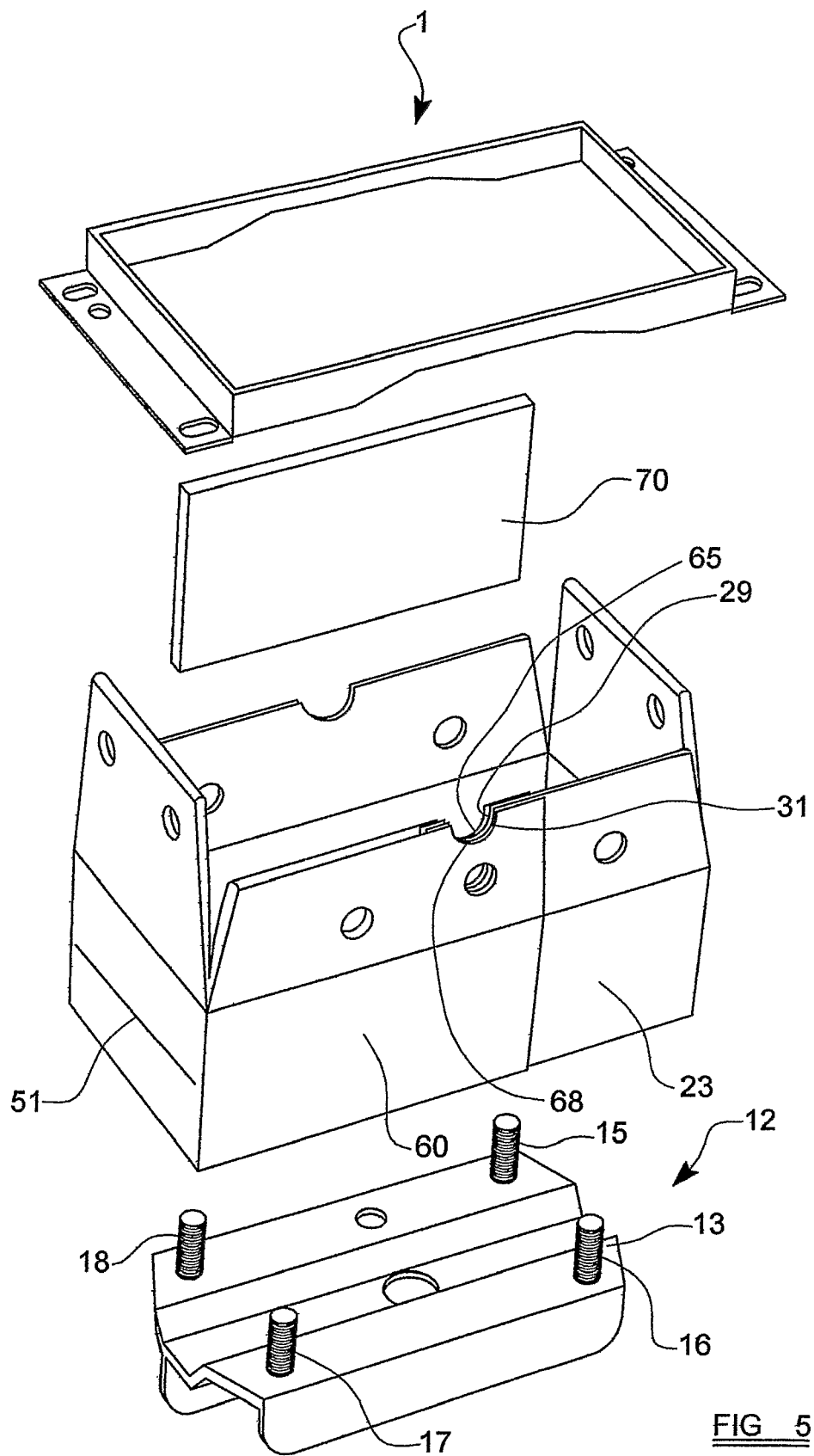
FIG. 5 is a perspective exploded view illustrating the frame and the blank, and the deflector ready for assembly, together with a reinforcing element.

As shown in FIG. 5, the frame 1 may then be inserted from above into the thus-folded blank, the frame being inserted between the adjacent tabs and panels to be located with the mounting lugs 7 and 11 extending through the slits 51, 32. The frame is thus received in the part of the folded blank 21 adjacent the fold-line 22. After the frame 1 has been inserted in position a reinforcing element 70 may be introduced between two adjacent wall-forming panels to reinforce a side-wall or end-wall of the housing. The reinforcing element may be in the form of a rectangular panel and may be made of any appropriate material such as rigid foamed plastics.

The frame and the blank, which constitutes a housing-forming element, thus combine to form a housing having side-walls and a floor. At the stage of assembly described, the floor is still "open" and not yet completed.

The diffuser 12 may then be inserted upwards, through the frame, with the studs 15, 16, 17, 18 extending upwardly. The plate 13 of the diffuser is brought to a position in which it is located adjacent the junction between the side-wall-forming panels and the floor-forming tabs. Initially the floor-forming tabs 22, 23, 42, 43, 60, 61, on the side-wall-forming panels are folded inwardly. It will now be appreciated that the extent of these floor-forming tabs is such that when folded inwardly the free edges of the tabs substantially co-align and the recesses 47, 65 (and all the other co-aligned recesses) are co-aligned to form an aperture. As the floor-forming tabs are folded inwardly, the co-aligned small apertures 44, 46, 48, 50 in the floor-forming tabs 42, 43 on the side-wall-forming elements and the co-aligned apertures 27, 63, 30, 67 on the terminal side-wall-forming panels 23, 24, 60, 61 are brought into engagement with the upwardly protruding studs of the deflector, thus beginning to secure the floor-forming tabs in position.

Subsequently the combined floor-forming tabs 25, 26 and 62, 66 carried by the end-walls are folded inwardly, to at least partly overlie the floor-forming tabs carried by the side-wall-forming panels. The co-aligned apertures 37, 39 and 38, 40 engage with the studs 15, 16, whilst the co-aligned apertures 55, 58, 56, 59 engage with the studs 17, 18. The engagement of the apertures in the floor-forming tabs with the studs secures the tabs in position to form the floor of the housing.

The floor-forming tabs 25, 26 and 62, 66 are of such a length that they do not obscure the aperture formed by the co-aligned recesses 47, 65 which is intended to receive the gas injection nozzle of an inflator. Also the tabs do not obscure the co-aligned apertures 28, 45 and 64, which are co-aligned with the aperture 20 formed on the base plate 13 of the deflector as shown in FIG. 2, to receive, for example, a pressure sensor.

It is to be appreciated that the floor-forming tabs have been folded inwardly to a position in which some of the floor-forming tabs overlie others of the floor-forming tabs, and the floor-forming tabs have been interconnected, by the effect of the studs, to form a floor for the air-bag assembly. Of course, as illustrated in FIG. 6 the air-bag assembly is in the inverted or upside down position.

A gas generator of any appropriate form may be mounted on the four studs, with a gas injection nozzle of the gas generator extending inwardly through the aperture constituted by the co-aligned recesses 47, 65.

Figure 6:
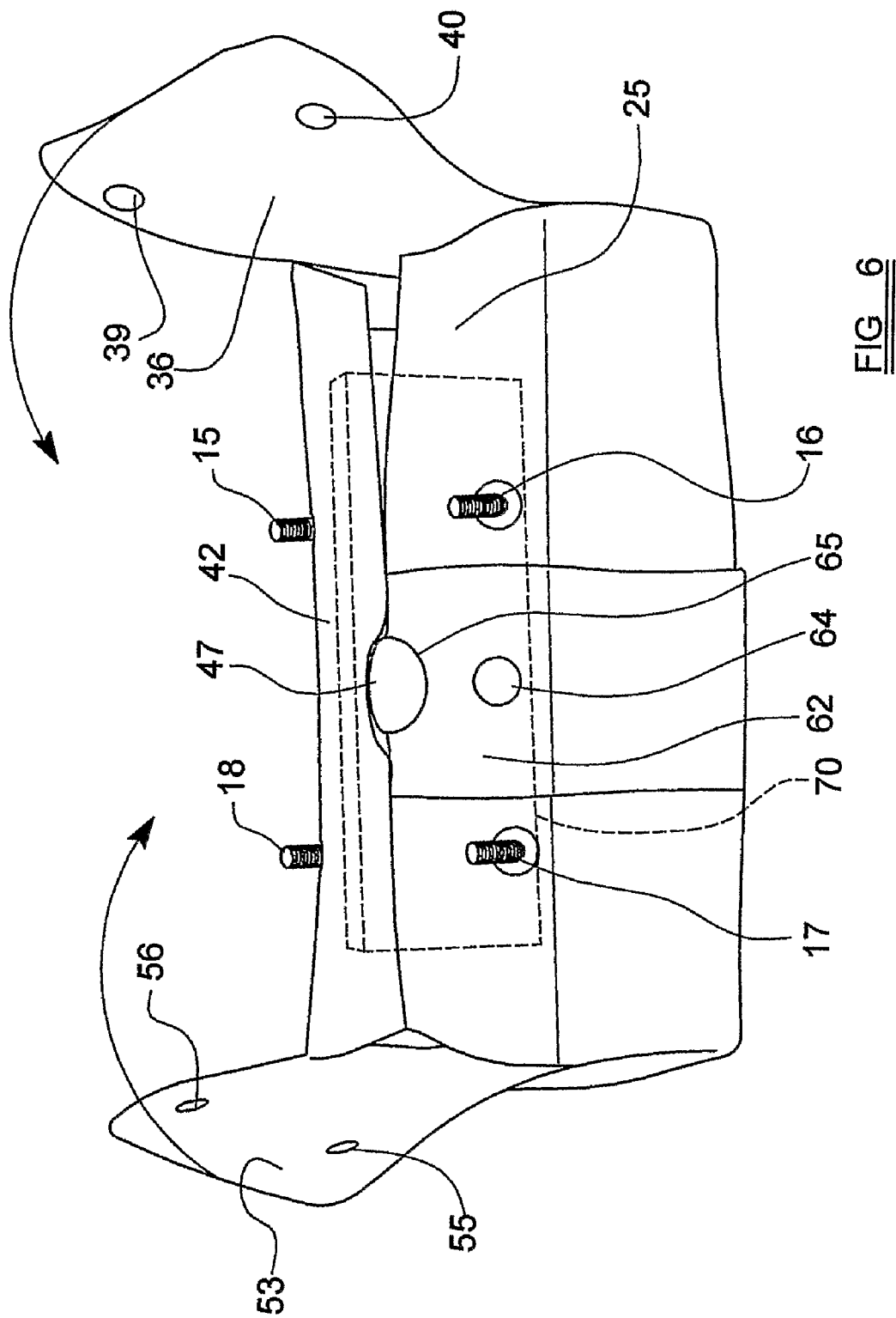
FIG. 6 is a view of the floor-forming tabs of the blank being folded into position.

Shown in phantom in FIG. 6 is a reinforcing element 70 inserted between the two layers of fabric forming one side-wall of the housing for a purpose that will be described hereinafter.

Figure 7:
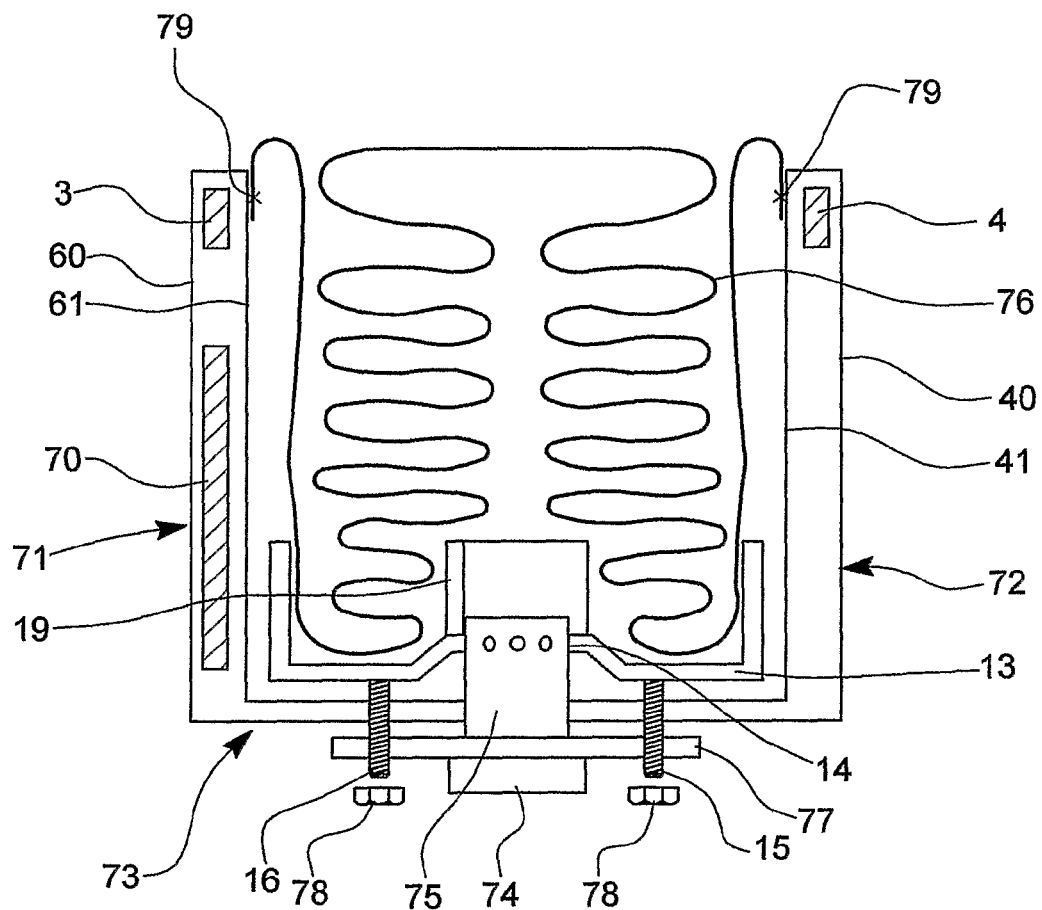
FIG. 7 is a diagrammatic sectional view of the air-bag housing when fully assembled.

Referring now to FIG. 7, which is a diagrammatic sectional figure, the air-bag assembly shown in the "upright" position illustrating the frame 1 towards the top of the housing, and it can be seen that the fabric blank now forms depending side-walls 71, 72, each of double thickness. The side-wall 72 is provided with the reinforcing element 70 located between the two layers of fabric forming the side-wall.

The side-walls 71, 72 each carry floor-forming tabs which are folded inwardly and interconnected to form a floor 73. Located beneath the floor 73 is a gas generator 74 having a gas injection nozzle 75 which extends through the floor, and through the central aperture 14 provided in the plate 13 of the diffuser 12 to inject gas into an air-bag 76 which is stored within the housing. The air-bag is stored in the housing in a folded state. The folding is illustrated schematically. An apertured flange 77 is mounted on the studs 151-18 of the deflector 122, and secured by nuts 78. The floor-forming tabs are thus securely trapped between the flange 77 and the plate 13.

The air-bag may be a 36 litre air-bag made of a 580 Dtex fabric.

The inflator may be a disc-shaped pyrotechnic inflator, as shown, but a hybrid inflator may be preferred.

The air-bag may be connected to the inflator in the region of the diffuser, but it is preferred that the mouth of the air-bag is sewn 79 or otherwise secured to the fabric blank 21 forming the housing in a region of the blank which is located adjacent the frame 1, as shown in FIG. 7. The fabric housing will thus form, effectively, part of the inflatable cushion when the air-bag is inflated. The fabric housing will provide a sufficient gas-tightness for this function. It is to be noted that virtually all air-bags are provided with a vent in order to vent the air-bag, and if there is some gas leakage from the described housing, this will not prove to be a significant inconvenience.

It is to be noted that the housing-forming element is not provided with a seam as such which extends across the side-walls of the housing. It is to be noted that the side-walls are formed from two superimposed layers of fabric, with those layers of fabric extending around the corner regions of the housing without any seam being present, and with the end parts of two side-wall-forming panels being tucked one inside the other. It is envisaged, therefore, that the risk of part of the air-bag being forced out of the housing through a corner-region of the housing during inflation is substantially non-existent. Also, with the fabric forming the tucked-in regions being appropriately dimensioned, and with the tucked-together regions being retained together by the effect of the frame positioned adjacent the fold-line, it is believed that there is no risk of any air-bag emerging from the part of the housing defined by the tucked-in regions.

It is believed that the housing being formed from two superimposed layers of fabric, with each layer carrying a respective floor-forming tab, so that the floor is formed from a plurality of inwardly folded tabs which are interconnected, will provide a structure which is sufficiently durable for the purpose, whilst being economic to manufacture and having a relatively low weight.

The reinforcing element 70 may be positioned in part of the air-bag module which, when the air-bag module is mounted in a motor vehicle, is located adjacent a potentially sharp object which might cause damage to the housing or to the air-bag.

The described air-bag module may be mounted in a motor vehicle by locating the apertures 11 of the flanges of the frame on appropriate locating pins and by using fastening screws or bolts which pass through the apertures 9 and 10 provided for that purpose.

The inflator may be secured to an underlying part of the motor vehicle to prevent the gas generator moving inadvertently during ordinary driving of the vehicle or during deployment of the air-bag, but in some embodiments the inflator may simply hang from the lower part of the housing.

Whilst the inflator has been shown in this embodiment to be located on the exterior of the housing, the inflator may be located in the interior of the housing or the inflator may be located between the layers of fabric which form the floor-forming tabs. Thus, in an embodiment of this type there may be lower floor-forming tabs which extend beneath the inflator and upper floor-forming tabs which extend above the inflator. In such an embodiment the floor-forming tabs on opposed sides of the fold-line of the blank would not necessarily be absolutely symmetrical, since the floor-forming tabs on one side of the fold-line may have a different configuration to the floor-forming tabs provided on the other side of the fold-line.

As the side-walls of the housing are of double thickness, clips may be mounted on the outer wall-forming panel of any wall of the housing, for example to retain parts of a wiring harness.

When used in this Specification and Claims, the terms "comprises" and "comprising" and variations thereof mean that the specified features, steps or integers are included. The terms are not to be interpreted to exclude the presence of other features, steps or components.

The invention claimed is:

1. An air-bag housing, the air-bag housing comprising:
a frame defining an opening and having a mounting arrangement to mount the frame in position, the frame supporting a separate housing-forming element constituted by a sheet of flexible material to form a housing having walls and a floor, the sheet of flexible material being in the form of a blank, the blank being folded about a fold-line to present superimposed wall-forming portions and floor-forming portions, the superimposed floor-forming portions including a plurality of floor-forming tabs, the frame being a one-piece frame that is inserted within the blank to be adjacent the fold-line, the floor being formed by the plurality of floor-forming tabs which at least partly overlie each other and which are secured in position to form the floor of the housing.

2. The air-bag housing according to claim 1, wherein the housing-forming element has two opposed regions, the opposed regions overlapping between the ends of one side-wall of the housing, the housing-forming element consequently extending seamlessly around corners of the housing.

3. The air-bag housing according to claim 2, wherein the superimposed wall-forming portions defining the walls of the housing carry the floor-forming tabs.

4. The air-bag housing according to claim 3, wherein each wall-forming portion carries a respective floor-forming tab.

5. The air-bag housing according to claim 1, wherein the blank is substantially symmetrical about the fold-line such that the wall-forming portions and floor-forming tabs are substantially symmetrical about the fold-line.

6. The air-bag housing according to claim 1, wherein the mounting arrangement of the frame comprises two outwardly extending flanges, the housing-forming element being provided with slits to accommodate the flanges.

7. The air-bag housing according to claim 1, wherein the sheet of flexible material is of woven material.

8. The air-bag housing according to claim 7, wherein the woven material is a woven fabric of 470 Dtex.

9. The air-bag housing according to claim 1, wherein one wall of the walls of the housing is formed of two superimposed layers of the sheet of flexible material with a reinforcing element located between said layers.

10. The air-bag housing of claim 1 in combination with an air-bag assembly, the air-bag assembly further comprising an inflator secured to the floor of the housing and an air-bag contained within the housing to be inflated by gas from the inflator.

11. The air-bag assembly according to claim 10, wherein the inflator is mounted in position by means of a plurality of studs passing through co-aligned apertures formed in the floor-forming tabs which at least party overlie each other to secure the floor-forming tabs in position.

12. The air-bag assembly according to claim 11, wherein a deflector is provided within the housing, connected to the gas generator by means of said studs.

13. The air-bag assembly according to claim 10, wherein the air-bag has an open mouth which is secured to the housing-forming element in a region adjacent the frame.

14. The air-bag assembly according to claim 1, wherein the frame is inserted within the blank so as to be between the superimposed wall-forming portions and adjacent the fold-line.

15. An air-bag housing, the air-bag housing comprising:
a frame defining an opening adapted to receive an air-bag and having a mounting arrangement to mount the frame in position, the frame being a one-piece frame; and
a housing-forming element constituted by a sheet of flexible material to form a housing having walls and a floor, the sheet of flexible material being in the form of a blank having a plurality of wall-forming panels and floor-forming tabs each of which are substantially symmetrical about opposed sides of an axially extending fold-line, the blank being folded about the fold-line to present superimposed double thickness wall-forming panels and floor-forming tabs, the superimposed floor-forming tabs at least partly overlying each other and being secured in position to form the floor of the housing, the superimposed wall-forming panels including a pair of opposed panels that overlap each other between ends of one side-wall of the housing such that the housing-forming element consequently extends seamlessly around corners of the housing;
wherein the housing-forming element is supported by the frame, the frame being inserted within the housing so as to be adjacent the axially extending fold line.

16. The air-bag housing according to claim 15, wherein each wall-forming panel carries a respective floor-forming tab.

17. The air-bag housing according to claim 15, wherein the mounting arrangement of the frame comprises two longitudinally opposed outwardly extending flanges, the housing-forming element being provided with slits to accommodate the flanges therethrough.

18. The air-bag housing according to claim 15, wherein the frame is inserted within the housing between the superimposed wall-forming panels so as to be adjacent the axially extending fold line.

19. The air-bag housing according to claim 18, wherein the frame includes a perimeter shape complimentary to a perimeter shape of the housing so as to support the housing when inserted therein.

* * * * *